United States Patent
Acuña Pérez et al.

(10) Patent No.: US 12,013,272 B2
(45) Date of Patent: Jun. 18, 2024

(54) SENSOR DEVICE AND SYSTEM FOR IN-LINE MEASUREMENT OF SUPERFICIAL GAS VELOCITY, FORTH DEPTH, APPARENT DENSITY AND HOLDUP IN FLOTATION CELLS

(71) Applicants: UNIVERSIDAD CATÓLICA DEL NORTE, Antofagasta (CL); UNIVERSIDAD TÉCNICA FEDERICO SANTA MARIA, Valparaiso (CL); ISPROTEC SPA, Antofagasta (CL)

(72) Inventors: Claudio Abraham Acuña Pérez, Viña del Mar (CL); Claudio Andrés Leiva Hurtubia, Antofagasta (CL)

(73) Assignees: Universidad Catolica del Norte, Antofagasta (CL); Universidad Tecnica Federico Santa Maria, Valparaiso (CL); Isprotec SPA, Antofagasta (CL)

( * ) Notice: Subject to any disclaimer, the term of this patent is extended or adjusted under 35 U.S.C. 154(b) by 437 days.

(21) Appl. No.: 17/418,985

(22) PCT Filed: Dec. 16, 2019

(86) PCT No.: PCT/CL2019/050142
§ 371 (c)(1),
(2) Date: Jun. 28, 2021

(87) PCT Pub. No.: WO2020/132767
PCT Pub. Date: Jul. 2, 2020

(65) Prior Publication Data
US 2022/0107214 A1    Apr. 7, 2022

(30) Foreign Application Priority Data
Dec. 28, 2018    (CL) .................................... 3885-2018

(51) Int. Cl.
*G01F 1/74*    (2006.01)
*B03D 1/02*    (2006.01)
*G01N 29/024*    (2006.01)

(52) U.S. Cl.
CPC ................. *G01F 1/74* (2013.01); *B03D 1/02* (2013.01); *G01N 29/024* (2013.01); *G01N 2291/02818* (2013.01)

(58) Field of Classification Search
CPC ....... G01N 29/024; G01N 2291/02818; G01N 9/26; G01F 1/74; G01F 1/76; B03D 1/02; B03D 1/028; B03D 1/00
See application file for complete search history.

(56) References Cited

U.S. PATENT DOCUMENTS 5,467,876 A * 11/1995 Hicks ................... B03D 1/1468
210/221.2

FOREIGN PATENT DOCUMENTS

JP          2017070884 A * 4/2017 ............. B03D 1/02
WO    WO-2018225003 A1 * 12/2018 ............. B03D 1/028

* cited by examiner

*Primary Examiner* — Benjamin R Schmitt
(74) *Attorney, Agent, or Firm* — Morgan, Lewis & Bockius LLP (57) ABSTRACT

The present invention relates to the field of measurement devices, specifically to devices for measuring pressure and flow as well as derived quantities, and in particular provides a sensor device for in-line measurement of superficial gas velocity, froth depth, apparent density and holdup in flotation cells, which comprises: a first tube; a second tube; a first valve connected to said first tube; a second valve connected to said second tube; a first pressure meter connected to said first tube; a second pressure meter connected to said second tube; a first mass flow meter connected to said first valve; and a second mass flow meter connected to said second valve. The present invention also provides a system for (Continued)

in-line measurement of superficial gas velocity in flotation cells.

14 Claims, 2 Drawing Sheets

FIG. 1

FIG. 2

SENSOR DEVICE AND SYSTEM FOR IN-LINE MEASUREMENT OF SUPERFICIAL GAS VELOCITY, FORTH DEPTH, APPARENT DENSITY AND HOLDUP IN FLOTATION CELLS

TECHNICAL FIELD OF THE INVENTION

The present invention relates to the field of measuring devices, more specifically to devices for measuring pressure and flow, as well as derived magnitudes, and in particular provides a sensing device and a system for on-line measurement of surface gas velocity, froth depth, apparent density and holdup in flotation cells and reactors with gas injection, which allows the kinetics of the process to be controlled.

BACKGROUND OF THE INVENTION

In the mining field, it has been shown that the determination of the surface gas velocity in flotation cells is a relevant parameter that allows controlling or predicting the efficiency of the flotation process. Consequently, a recurrent problem of the state of the art is the lack of devices for the on-line measurement of the surface gas velocity, froth depth, apparent density and holdup, which would allow finding a set of parameters that optimizes the gas flow distribution and allows a kinetic control of the process in question.

However, the measurement of surface gas velocity in flotation cells has proven to be a difficult problem to solve.

Some solutions can be found in the state of the art. For example, the article "Gas dispersion measurements in flotation cells", published by Gomez and Finch in Int. J. Miner. Process. 84 (2007) 51-58, describes two alternatives for measuring surface gas velocity in flotation cells. However, the first alternative, based on a parallel tube, is not suitable for continuous surface gas velocity measurement, while the second alternative, based on an orifice plate, presents problems associated with gas velocity measurement settling time. Additionally, the second alternative requires prior calibration, which is not practicable in industrial environments.

Accordingly, a sensing device and system for on-line measurement of surface gas velocity in flotation cells is required to overcome the shortcomings of the above technique.

SUMMARY OF THE INVENTION

The present invention provides a sensing device for on-line measurement of surface gas velocity, froth depth, apparent density and holdup in flotation cells, characterized in that it comprises: a first tube having a first upper portion, a first lower portion and a first internal conduit; a second tube, inserted in said first internal conduit of said first tube, having a second upper portion, a second lower portion and a second internal conduit, said second tube having a length greater than said first tube; a first valve connected to the first upper portion of said first tube; a second valve connected to the second upper portion of said second tube; a first pressure gauge connected to the first upper portion of said first tube; a second pressure gauge connected to the second upper portion of said second tube; a first mass flow meter connected to the portion of said first valve opposing said first tube; and a second mass flow meter connected to the portion of said second valve opposing said second tube.

In a preferred embodiment, the sensing device is characterized in that said first tube has an internal diameter of between 80 mm and 400 mm.

In another preferred embodiment, the sensing device is characterized in that said first tube has a length of between 500 mm and 1000 mm.

In a further preferred embodiment, the sensing device is characterized in that said second tube has an internal diameter of between 40 mm and 300 mm.

In another preferred embodiment, the sensing device is characterized in that said second tube has a length of between 1200 mm and 3000 mm.

In a preferred embodiment, the sensing device is characterized in that said first and second valves are solenoid valves.

In another preferred embodiment, the sensing device is characterized in that said first and second pressure gauges are piezoelectric and resistive sensors.

In a further preferred embodiment, the sensing device is characterized in that said first and second mass flow meters are low pressure drop turbine sensors.

In another preferred embodiment, the sensing device is characterized in that said first tube and said second tube are arranged in a substantially coaxial manner.

In a preferred embodiment, the sensing device is characterized in that the upper end of said first tube is disposed substantially coplanar with the upper end of said second tube.

In a preferred embodiment, the sensing device is characterized in that both tubes, the first and second tubes, are interconnected through a differential pressure sensor, which measures the hydrostatic pressure difference continuously.

This invention provides, in addition, a system for the on-line measurement of the surface gas velocity in flotation cells, characterized in that it comprises: a sensing device comprising: a first tube having a first upper portion, a first lower portion and a first internal conduit; a second tube, inserted in said first internal conduit of said first tube, having a second upper portion, a second lower portion and a second internal conduit, said second tube having a length greater than said first tube; a first valve connected to the first upper portion of said first tube; a second valve connected to the second upper portion of said second tube; a first pressure gauge connected to the first upper portion of said first tube; a second pressure gauge connected to the second upper portion of said second tube; a first mass flow meter connected to the portion of said first valve opposing said first tube; and a second mass flow meter connected to the portion of said second valve opposing said second tube; and a processor operatively connected to said first and second valves, said first and second pressure gauges and said first and second mass flow meters; wherein said processor is configured to: controlling the opening and closing of said first and second valves; obtaining pressure measurements from said first and second pressure gauges; obtaining mass flow measurements from said first and second mass flow meters; and obtaining a surface gas velocity value from said pressure measurements and said mass flow measurements.

In a preferred embodiment, the system is characterized in that it additionally comprises an information storage memory operatively connected to said processor, and in that said processor is configured to read information from said storage memory and write information to said storage memory.

In another preferred embodiment, the system is characterized in that said processor is additionally configured to communicate said surface gas velocity value to a central controller.

In a further preferred embodiment, the system is characterized in that in order to obtain said surface gas velocity value, said processor is configured to: obtain a pulp apparent density value from said pressure values obtained from said first and second pressure gauges and from the length difference between said first and second tubes; obtain a pressure variation value as a function of time from said pressure values obtained from said first and second pressure gauges; to obtain a value of atmospheric pressure; and to obtain a value of surface gas velocity from said value of apparent density of the pulp, said value of pressure variation as a function of time, said value of atmospheric pressure and the value of the length of the portion of said first tube which is submerged in said flotation cell.

DETAILED DESCRIPTION OF THE INVENTION

Hereinafter, a detailed description of the present invention will be made, referring for this purpose to the figures accompanying the present application.

Figure 2:
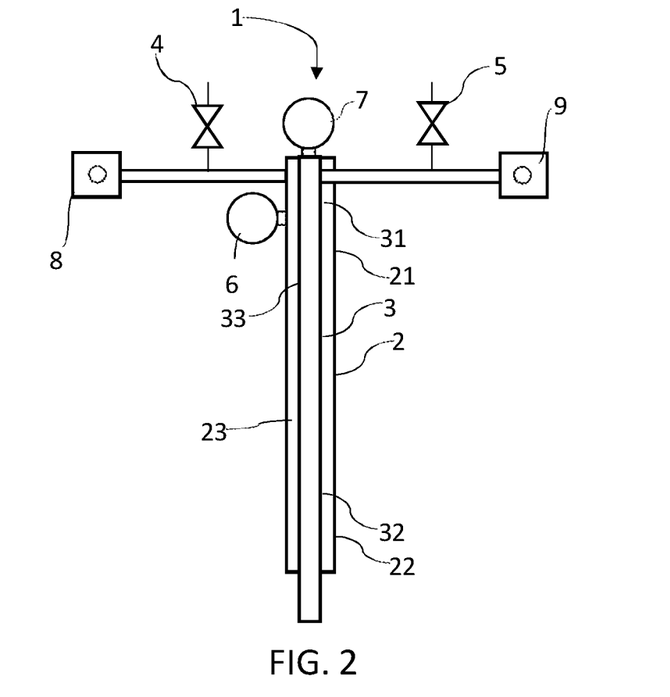
FIG. 2 shows a schematic view of a first embodiment of the sensing device that is the subject of the present invention.

A first object of the present invention, as schematically seen in FIG. 2, is a sensing device (1) for on-line measurement of surface gas velocity, froth depth, apparent density and holdup in flotation cells, comprising, in essential embodiments: a first tube (2) having a first upper portion (21), a first lower portion (22) and a first internal conduit (23); a second tube (3), inserted in said first internal conduit (23) of said first tube (2), having a second upper portion (31), a second lower portion (32) and a second internal conduit (33), said second tube (3) having a longer length than said first tube (2); a first valve (4) connected to the first upper portion (21) of said first tube (2); a second valve (5) connected to the second upper portion (31) of said second tube (3); a first pressure gauge (6) connected to the first upper portion (21) of said first tube (2); a second pressure gauge (7) connected to the second upper portion (31) of said second tube (3); a first mass flow meter (8) connected to the portion of said first gauge (5) opposing said first tube (2); and a second mass flow meter (9) connected to the portion of said second gauge (6) opposing said second tube (3).

With respect to said first tube (2), as indicated, the same possesses a first upper portion (21), a first lower portion (22) and a first internal conduit (23). On the other hand, with respect to said second tube (3), the same possesses a second upper portion (31), a second lower portion (32) and a second internal conduit (33), as well as a length greater than that of said first tube (2). Said second tube (3), moreover, is inserted in said first conduit (23) of said first tube (2). In the context of the present invention, it is to be understood the relative references top, bottom, side, left, right, up, down, front, back, front, back and the like, as would be observed by an operator when the sensing device (1) or the system (10) which are the subject of the present invention are normally in use.

In a preferred embodiment, without limiting the scope of the present invention, said first tube (2) is sealed at its upper end. In another preferred embodiment, without this limiting the scope of the present invention, said second tube (3) is sealed at its upper end. The means by which said sealing of said first tube (2) or said second tube (3) is obtained do not limit the scope of the present invention. For example, and without limiting the scope of the present invention, said first tube (2) may comprise a cap sealing it at its upper end, to which said second tube (3) is functionally coupled. In another example, without limiting the scope of the present invention, said second tube (3) may be a tube possessing a single opening, which is disposed at its lower end.

In the case of said first tube (2), without this limiting the scope of the present invention and as will be explained in detail below, when the sensing device (1) which is the object of the present invention is normally in use, said first upper portion (21) protrudes from the flotation cell, while said first lower portion (22) is submerged in said flotation cell. In the case of said second tube (3), without limiting the scope of the present invention and as will be explained in detail below, when the sensing device (1) which is the object of the present invention is normally in use, said second upper portion (31) protrudes from the flotation cell, while said second lower portion (32) is submerged in said flotation cell such that the lower end of said second tube (3) is at a shallower depth than the lower end of said first tube (2).

The geometries of said first tube (2) and of said second tube (3), in particular their lengths and internal and outer diameters, do not limit the scope of the present invention and will depend on the specific conditions in which the sensing device (1) which is the subject of the present invention is used.

For example, and without limiting the scope of the present invention, said first tube (2) may possess a length of between 500 mm and 1000 mm, more preferably between 500 mm and 700 mm. Moreover, the internal diameter of said first tube (2) may be, for example and without this limiting the scope of the present invention, between 80 mm and 400 mm, more preferably of 100 mm.

In the case of said second tube (3), for example and without this limiting the scope of the present invention, the same may possess a length of between 1200 mm and 3000 mm, more preferably between 1200 mm and 2000 mm. Moreover, the internal diameter of said second tube (3) may be, for example and without this limiting the scope of the present invention, between 40 mm and 300 mm, more preferably of 50 mm.

A person with average knowledge in the technical field will note that the internal diameter of said first tube (2) determines the outer diameter of said second tube (3), since said second tube (3) must be susceptible of being inserted into said first internal conduit (23) of said first tube (2).

Additionally, the material from which said first tube (2) or said second tube (3) are constructed does not limit the scope of the present invention and will depend on the fluid present in the flotation cell in which the sensing device (1) which is the subject of the present invention is used. In a preferred embodiment, without limiting the scope of the present invention, said first tube (2) and said second tube (3) are made of a corrosion resistant material, such as may be, without being limited to these, stainless steel, Teflon™, glass, among others, as well as combinations thereof.

As previously mentioned, said second tube (3) is inserted into the first internal conduit (23) of said first tube (2). In this sense, it should be understood that the relative position between said first tube (2) and said second tube (3) does not limit the scope of the present invention. In particular, said second tube (3) may be totally or partially inserted in said first internal conduit (23) without this limiting the scope of the present invention. In a preferred embodiment, without this limiting the scope of the present invention, said second tube (3) is completely inserted in said first internal conduit (23) of said first tube (2). In an even more preferred embodiment, without this limiting the scope of the present invention, the upper end of said first tube (2) is arranged substantially coplanar with the upper end of said second tube (3).

In the context of the present invention, it is to be understood that the upper end of said first tube (2) is arranged substantially coplanar with the upper end of said second tube (3) when the angle formed by the planes defined by the upper end of said first tube (2) and the upper end of said second tube (3) is between 0° and 5°, more preferably between 0° and 2° and even more preferably is 0°, and when the distance between said upper end of said first tube (2) and said upper end of said second tube (3) is less than a certain value, for example and without this limiting the scope of the present invention, less than 10 mm, more preferably less than 5 mm and even more preferably less than 1 mm.

Additionally, the relative alignment between the axes of said first tube (2) and said second tube (3) does not limit the scope of the present invention. In a preferred embodiment, without limiting the scope of the present invention, said first tube (2) and second tube (3) are arranged substantially parallel. In the context of the present invention, it is to be understood that said first tube (2) and second tube (3) are arranged in a substantially parallel manner when the angle formed by their corresponding axes is between 0° and 5°, more preferably between 0° and 2° and even more preferably if said angle is 0°.

Moreover, the distance between the axes of said first tube (2) and second tube (3) does not limit the scope of the present invention. In a preferred embodiment, without limiting the scope of the present invention, said first tube (2) and second tube (3) are arranged in a substantially coaxial manner. In the context of the present invention, it is to be understood that said first tube (2) and second tube (3) are arranged in a substantially coaxial manner when, in addition to being arranged in a substantially parallel manner, the maximum distance between the axis of said first tube (2) and the axis of said second tube (3) is less than 0.1 times the diameter of the second internal conduit (33) of said second tube (3), more preferably less than 0.01 times said diameter and even more preferably when said distance is less than 0.001 times said diameter.

The sensing device (1) which is the subject of the present invention further comprises, in addition, a first valve (4) connected to the first upper portion (21) of said first tube (2) in fluid communication with said first internal conduit (23); and a second valve (5) connected to the second upper portion (31) of said second tube (3) in fluid communication with said second internal conduit (33).

With respect to said first and second valves (4, 5), the nature thereof does not limit the scope of the present invention and they may be either manual or automatic without this limiting the scope of the present invention. Said first and second valves (4, 5) may be, for example and without this limiting the scope of the present invention, needle valves, annular valve, gate valve, diaphragm valve, globe valve, fixed cone valve, ball valve, ball valve, ball valve, butterfly valve, as well as other types of valves known in the state of the art. In a preferred embodiment, without limiting the scope of the present invention, said first and second valves (4, 5) are solenoid valves. Said preferred embodiment has the advantage that it allows remote actuation of said first and second valves (4, 5), for example and without this limiting the scope of the present invention, by means of a processor operatively coupled thereto.

The function of said first and second valves (4, 5) is to seal said first and second tubes (2, 3), respectively, so as to provide a gas accumulation inside said first and second tubes (2, 3), or to open said first and second tubes (2, 3) allowing gas flow from said first and second tubes (2, 3) to the outside or to additional components.

In a preferred embodiment, without limiting the scope of the present invention, said first and second valves (4, 5) are connected, respectively to said first and second tubes (2, 3) by means of connections of the type of quick connection (Quick Flange). Moreover, said connections may possess a diameter, without limiting the scope of the present invention, between 10 mm and 150 mm, more preferably between 10 mm and 40 mm and even more preferably between 15 mm and 25 mm. In another preferred embodiment, without this limiting the scope of the present invention, said first and second valves (4, 5) may be connected, respectively to said first and second tubes (2, 3) by means of a threaded connection.

The sensing device (1) which is the subject of the present invention further comprises, in addition, a first pressure gauge (6) connected to the first upper portion (21) of said first tube (2) in fluid communication with said first internal conduit (23); and a second pressure gauge (7) connected to the second upper portion (31) of said second tube (3) in fluid communication with said second internal conduit (33).

The nature of said first pressure gauge (6) and second pressure gauge (7) does not limit the scope of the present invention and may be, for example and without limiting the scope of the present invention, diaphragm pressure gauges, piezoelectric sensors, thermocouple sensors, as well as any type of pressure sensor known in the state of the art. In a preferred embodiment, without limiting the scope of the present invention, said first and second pressure gauges (6, 7) are piezoelectric sensors. This preferred embodiment has the advantage that it allows remote acquisition of the pressure readings obtained by means of said first and second pressure gauges (6, 7), for example and without limiting the scope of the present invention, by means of a processor operatively coupled to said first and second pressure gauges (6, 7).

The manner in which said first and second pressure gauges (6, 7) are connected to said first and second tubes (2, 3) respectively, does not limit the scope of the present invention. Additionally, the position in said first and second upper portions (21, 31) in which said first and second pressure gauges (6, 7) are connected, respectively, do not limit the scope of the present invention.

In a preferred embodiment, without this limiting the scope of the present invention, said first and second pressure gauges (6, 7) are connected, respectively to said first and second tubes (2, 3) by means of connections of the type of quick connection (Quick Flange). Moreover, said connections may possess a diameter, without limiting the scope of the present invention, between 10 mm and 150 mm, more preferably between 10 mm and 40 mm and still more preferably between 15 mm and 25 mm. In another preferred embodiment, without this limiting the scope of the present invention, said first and second pressure gauges (6, 7) may be connected, respectively to said first and second tubes (2, 3) by means of a threaded connection.

Said first and second pressure gauges (6, 7) have the function of allowing the measurement of the pressure in said first and second tubes (2, 3) respectively. In this way, it is possible, for example and without this limiting the scope of the present invention, to obtain values of the pressures as a function of time, which can be obtained both with said first and second valves (4, 5) open or closed without this limiting the scope of the present invention.

The sensing device (1) which is the subject of the present invention further comprises a first mass flow meter (8) connected to the portion of said first valve (5) opposing said first tube (2); and a second mass flow meter (9) connected to the portion of said second valve (6) opposing said second tube (3).

With respect to said first and second mass flow meters (8, 9), the nature thereof does not limit the scope of the present invention. Said first and second mass flow meters (8, 9) may be, for example and without limiting the scope of the present invention, Venturi tubes, turbine flowmeters, electromagnetic flowmeters, ultrasonic flowmeters, as well as other types of mass flow meters known in the prior art. In a preferred embodiment, without limiting the scope of the present invention, said first and second mass flow meters (8, 9) are low pressure drop turbine sensors. Said preferred realization has the advantage that it allows a remote acquisition of said mass flow measurements, for example and without this limiting the scope of the present invention, by means of a processor operatively coupled to said first and second mass flow meters (8, 9).

In a preferred embodiment, without this limiting the scope of the present invention, said first and second mass flow meters (8, 9) are connected, respectively to said first and second valves (4, 5) by means of connections of the type of quick connection (Quick Flange). Moreover, said connections may possess a diameter, without limiting the scope of the present invention, between 10 mm and 150 mm, more preferably between 10 mm and 40 mm and still more preferably between 15 mm and 25 mm. In another preferred embodiment, without this limiting the scope of the present invention, said first and second mass flow meters (8, 9) may be connected, respectively, to said first and second valves (4, 5) by means of threaded connections.

Figure 1:
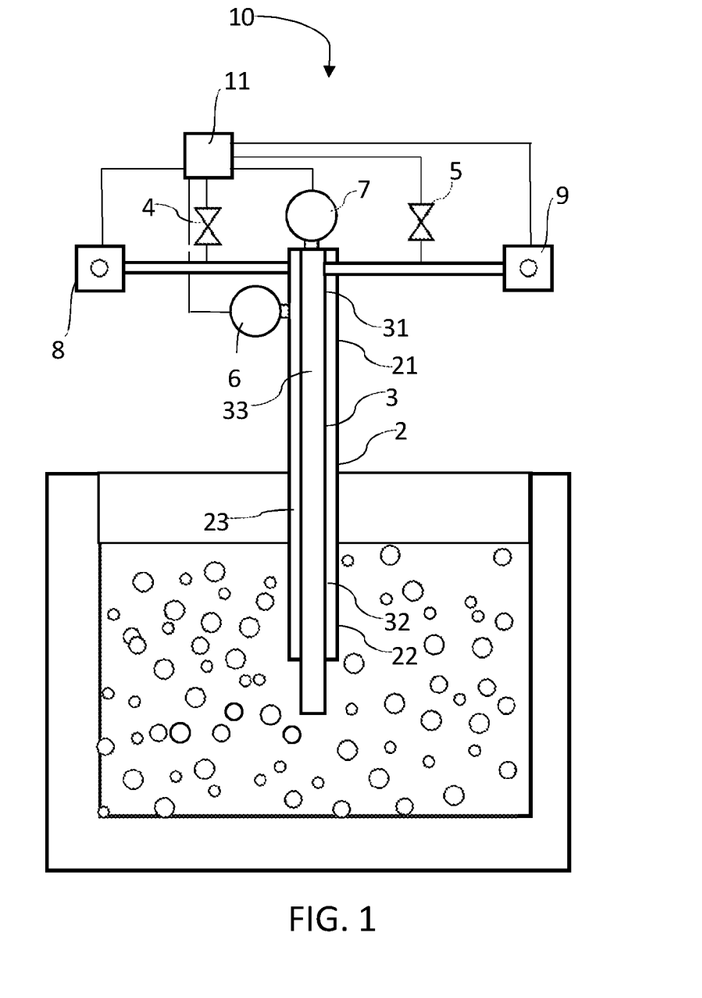
FIG. 1 shows a schematic view of a first embodiment of the system that is the subject of the present invention.

On the other hand, as schematically observed in FIG. 1, the present invention further provides a system (10) for the on-line measurement of surface gas velocity in flotation cells, comprising, in an essential manner: a sensing device comprising: a first tube (2) having a first upper portion (21), a first lower portion (22) and a first internal conduit (23); a second tube (3), inserted in said first internal conduit (23) of said first tube (2), having a second upper portion (31), a second lower portion (32) and a second internal conduit (33), said second tube (3) having a longer length than said first tube (2); a first valve (4) connected to the first upper portion (21) of said first tube (2); a second valve (5) connected to the second upper portion (31) of said second tube (3); a first pressure gauge (6) connected to the first upper portion (21) of said first tube (2); a second pressure gauge (7) connected to the second upper portion (31) of said second tube (3); a first mass flow meter (8) connected to the portion of said first valve (5) opposing said first tube (2); and a second mass flow meter (9) connected to the portion of said second valve (6) opposing said second tube (3); and a processor (11) operatively connected to said first and second valves (4, 5), to said first and second pressure gauges (6, 7) and to said first and second mass flow meters (8, 9); wherein said processor (11) is configured to: controlling the opening and closing of said first and second valves (4, 5); obtaining pressure measurements from said first and second pressure gauges (6, 7); obtaining mass flow measurements from said first and second mass flow meters (8, 9); and obtaining a value of surface gas velocity, froth depth, apparent density and holdup from said pressure measurements and said mass flow measurements.

With respect to said sensing device (1), all previously described options for said sensing device (1) individually are applicable to said sensing device (1) forming part of the system (10), without limiting the scope of the present invention.

As previously mentioned, the system (10) which is the subject of the present invention comprises a processor (11) operatively connected to said first and second valves (4, 5), to said first and second pressure sensors (6, 7) and to said first and second mass flow meters (8, 9).

In this sense, it will be understood that said processor (11) is operatively connected to said first and second valves (4, 5) when it is configured to control the opening and closing of said first and second valves (4, 5). The manner in which said processor (11) controls the opening and closing of said first and second valves (4, 5) does not limit the scope of the present invention. For example, and without limiting the scope of the present invention, said processor (11) may be configured to continuously open said first and second valves (4, 5), wherein said first and second valves (4, 5) may acquire any opening state between a fully closed position and a fully open position. However, in another example and without limiting the scope of the present invention, said processor (11) may be configured to discretely open said first and second valves (4, 5), wherein said first and second valves (4, 5) may only acquire one set of opening states between a fully closed position and a fully open position. In a preferred embodiment, without limiting the scope of the present invention, said processor (11) is configured to control said first and second valves (4, 5) such that they can acquire only a fully open position or a fully closed position. A person of average skill, however, will note that the manner of operatively connecting said processor (11) and said first and second valves (4, 5) will depend on the nature of said first and second valves (4, 5).

In the context of the present invention, it will further be understood that said processor (11) is operatively connected to said first and second pressure gauges (6, 7) when said processor (11) is configured to obtain values corresponding to pressure measurements from said first and second pressure gauges (6, 7). In a preferred embodiment, without limiting the scope of the present invention, said processor (11) may be configured to obtain an electrical signal from each of said first and second pressure gauges (6, 7), wherein the amplitude of said electrical signal is correlated with the corresponding pressure measurements. In another preferred embodiment, without limiting the scope of the present invention, a data acquisition interface may be provided to enable said processor to obtain said values corresponding to pressure measurements. Said data acquisition interface may be, for example and without limiting the scope of the present invention, an analog to digital converter. A person with average knowledge in the technical field will note, however, that the manner of operatively connecting said processor (11) with said first and second pressure gauges (6, 7) will depend on the nature of said first and second pressure gauges (6, 7).

Moreover, said processor (11) may be configured to control said first and second pressure gauges (6, 7) in any manner envisaged by a person having average knowledge in the technical field. For example, and without limiting the scope of the present invention, said processor (11) may be configured to control said first and second pressure gauges (6, 7) so that the acquisition of pressure measurements is substantially continuous in time. However, in another preferred embodiment, without limiting the scope of the present invention, said processor (11) may be configured to control said first and second pressure gauges (6, 7) so that the acquisition of pressure measurements is at regular intervals in time. In this last preferred embodiment, the duration of said regular intervals does not limit the scope of the present invention and may be, for example and without this limiting the scope of the present invention, between 0.1 seconds and 3 seconds, more preferably between 0.2 seconds and 1 second and still more preferably between 0.5 seconds and 0.8 seconds.

In the context of the present invention, it will further be understood that said processor (11) is operatively connected to said first and second mass flow meters (8, 9) when said processor (11) is configured to obtain values corresponding to mass flow measurements from said first and second mass flow meters (8, 9). In a preferred embodiment, without limiting the scope of the present invention, said processor (11) may be configured to obtain an electrical signal from each of said first and second mass flow meters (8, 9), wherein the amplitude of said electrical signal is correlated with the corresponding mass flow measurements. In another preferred embodiment, without limiting the scope of the present invention, a data acquisition interface may be provided that allows said processor to obtain said values corresponding to mass flow measurements. Said data acquisition interface may be, for example and without limiting the scope of the present invention, an analog to digital converter. A person with average knowledge in the technical field will note, however, that the manner of operatively connecting said processor (11) with said first and second mass flow meters (8, 9) will depend on the nature of said first and second mass flow meters (8, 9).

Moreover, said processor (11) may be configured to control said first and second mass flow meters (8, 9) in any manner envisaged by a person having average knowledge in the technical field. For example, and without limiting the scope of the present invention, said processor (11) may be configured to control said first and second mass flow meters (8, 9) so that the acquisition of mass flow measurements is substantially continuous in time. However, in another preferred embodiment, without limiting the scope of the present invention, said processor (11) may be configured to control said first and second mass flow meters (8, 9) so that the acquisition of mass flow measurements is at regular intervals in time. In this last preferred embodiment, the duration of said regular intervals does not limit the scope of the present invention and may be, for example and without this limiting the scope of the present invention, between 0.1 seconds and 3 seconds, more preferably between 0.2 seconds and 1 second and still more preferably between 0.5 seconds and 0.8 seconds.

Means by which said operating connection is provided between said processor (11) and said first and second valves (4, 5), said first and second pressure gauges (6, 7) or said first and second mass flow meters (8, 9) do not limit the scope of the present invention. For example, and without limiting the scope of the present invention, at a physical level, said first and second valves (4, 5), said first and second pressure gauges (6, 7) or said first and second mass flow meters (8, 9) can be connected to said processor (11) via appropriate cables or wires, for example via USB cables, Ethernet, RS-232, or other known wired connections. In another example embodiment, without limiting the scope of the present invention, said first and second valves (4, 5), said first and second pressure gauges (6, 7) or said first and second mass flow meters (8, 9) can be connected to said processor (11) wirelessly, for example, via a local Wi-Fi connection, Bluetooth, Zigbee, or other wireless communication modes known in the prior art.

As mentioned above, said operative connection between said processor (11) and said first and second valves (4, 5) requires said processor (11) to be able to control the opening and closing of said first and second valves (4, 5). Additionally, said operative connection between said processor (11) and said first and second pressure gauges (6, 7) requires that said processor (11) can obtain values corresponding to pressure measurements from said first and second pressure gauges (6, 7). Further, said operative connection between said processor (11) and said first and second mass flow meters (8, 9) requires that said processor (11) can obtain values corresponding to mass flow measurements from said first and second mass flow meters (8, 9).

Additionally, said processor (11) is configured to obtain a value of the surface gas velocity from said pressure measurements and said mass flow measurements.

The manner in which said processor (11) obtains said surface gas velocity value from said pressure measurements and said mass flow measurements does not limit the scope of the present invention. For example, and without limiting the scope of the present invention, said processor (11) may be configured to implement a mathematical model to obtain said surface gas velocity value.

In a preferred embodiment, without limiting the scope of the present invention, said processor (11) may be configured to obtain a pulp apparent density value from said pressure values obtained from said first and second pressure gauges (6, 7) and from the length difference between said first and second tubes (2, 3). In a more preferred embodiment, without limiting the scope of the present invention, said apparent density value of the pulp is obtained by applying the following mathematical formula:

$$\rho_B = \frac{p_1 - p_2}{L_1 - L_2}$$

where:
 $\rho_B$ is the value of the apparent density of the pulp;
 $p_1$ is the pressure value measured at the first pressure gauge (6);
 $p_2$ is the pressure value measured at the second pressure gauge (7);
 $L_1$ is the length of the first tube (2); and
 $L_2$ is the length of the second tube (2).

In another preferred embodiment, without limiting the scope of the present invention, said processor (11) may be configured to obtain a pressure variation value as a function of time from said pressure values obtained from said first and second pressure gauges (6, 7). The manner in which said processor (11) obtains said pressure variation value as a function of time does not limit the scope of the present invention. For example, and without limiting the scope of the present invention, said processor (11) may be configured to obtain said pressure variation value as a function of time by applying the following mathematical formula:

$$\left(\frac{dp}{dt}\right)_i = \frac{p_{i+1} - p_{i-1}}{2\Delta t}$$

where:

$$\left(\frac{dp}{dt}\right)_i$$

is the value or the pressure variation as a function of time at instant i;

$p_{i+1}$ is the pressure value at the instant i+1;
$p_{i-1}$ is the pressure value at the instant i−1; and
$\Delta t$ is the time variation between the instant i and the instant i+1.

In another preferred embodiment, said processor (11) may be configured to obtain an atmospheric pressure value. In a further preferred embodiment, said processor (11) may be configured to obtain said atmospheric pressure value from a third pressure gauge (not illustrated in the figures) arranged to perform said measurement. However, in other preferred embodiments, said processor (11) may be configured to obtain said atmospheric pressure value from other sources. For example, and without limiting the scope of the present invention, said processor (11) may be configured to obtain said atmospheric pressure value from the internet, for which it is suitably connected, or may be configured to internally store an atmospheric pressure value. A person of average skill will note that either mode of obtaining said atmospheric pressure value may be used without limiting the scope of the present invention.

In a further preferred embodiment, said processor (11) may be configured to obtain a gas surface velocity value from said apparent density value of the pulp, said pressure variation value as a function of time, said atmospheric pressure value and the length value of the portion of said first tube (2) which is submerged in said flotation cell. The manner in which said processor (11) obtains said gas surface velocity value does not limit the scope of the present invention. For example, and without limiting the scope of the present invention, said processor (11) can obtain said value of gas surface velocity by applying the following mathematical formula:

$$J_{G,i} = \frac{p_{ATM} + \rho_B L_1}{\rho_B (p_{ATM} + \rho_B L_{1u})}\left(\frac{dp}{dt}\right)_i$$

where:

$J_{G,i}$ is the gas surface velocity at the instant i;
$p_{ATM}$ is the atmospheric pressure value;
$\rho_B$ is the value of the apparent density of the pulp;
$L_1$ is the length of the first tube (2);
$L_{1u}$ is the length of the portion of the first tube (2) which is submerged in the flotation cell; and $$\left(\frac{dp}{dt}\right)_i$$

is the value of the pressure variation as a function of time at instant i.

In another preferred embodiment, said processor (11) may be configured to obtain a surface gas velocity value from said mass flow measurements obtained from said first and second mass flow meters (8, 9). For example, and without limiting the scope of the present invention, said processor (11) may obtain said surface gas velocity value by applying the following mathematical formula:

$$J_{G,i} = \frac{Q_{1i}}{(S_1 - S_2)}$$

where:

$J_{G,i}$ is the gas surface velocity at the instant i;
$Q_{1i}$ is the mass flow value measured at the first mass flow meter (8) at instant i;
$S_1$ is the cross section of the first internal conduit (23) of the first tube (2); and
$S_2$ is the cross section of the second tube (3).

In another preferred embodiment, said processor (11) may be configured to obtain a calibration curve of the surface gas velocity as a function of the mass flow measured at said first and second mass flow meters (8, 9). In said preferred embodiment, without limiting the scope of the present invention, said processor may be configured to obtain a plurality of mass flow values from said first and second mass flow meters (8, 9); obtain a value of the surface gas velocity according to the method using pressure measurements, for each of said mass flow values; and obtain a calibration curve of the surface gas velocity as a function of the mass flow measured in said first and second mass flow meters (8, 9).

In another preferred embodiment, without limiting the scope of the present invention, said processor (11) may be additionally configured to communicate said surface gas velocity value to a central controller. In this preferred embodiment, without limiting the scope of the present invention, said processor (11) may obtain said surface gas velocity value according to any method without limiting the scope of the present invention.

The manner in which said processor (11) communicates said surface gas velocity value to a central controller does not limit the scope of the present invention. For example, and without limiting the scope of the present invention, said processor (11) and said central controller may be connected via a local network, which may be wired or wireless. However, in another example embodiment and without limiting the scope of the present invention, said processor (11) and said central controller may be connected to the internet, and said processor (11) may be configured to communicate said surface gas velocity value to said central controller using said network.

In another preferred embodiment, without limiting the scope of the present invention, said system (10) may additionally comprise a storage memory (not illustrated in the figures) operatively connected to said processor (11). In this preferred embodiment, said processor (11) is additionally configured to write information to said storage memory and read information from said storage memory. For example, and without limiting the scope of the present invention, said processor (11) may be configured to store pressure values obtained from said first and second pressure gauges (6, 7) in said storage memory; store mass flow values obtained from said first and second mass flow meters (8, 9) in said storage memory; storing surface gas velocity values obtained in said storage memory; reading pressure values stored in said storage memory; reading mass flow values stored in said storage memory; reading surface gas velocity values stored in said storage memory; and executing computer programs stored in said storage memory.

The nature of said storage memory, as well as its capacity, do not limit the scope of the present invention. Said memory may be volatile or non-volatile without limiting the scope of the present invention. For example, and without limiting the scope of the present invention, said storage memory may be a Flash memory, a solid-state disk, a hard disk drive, a RAM memory, as well as a combination of the previously listed components.

According to the previously detailed description, it is possible to obtain a sensing device (1) and a system (10) for on-line measurement of the surface gas velocity in flotation cells which allows to overcome the deficiencies of the previous technique.

It should be understood that the various options described for particular technical features can be combined in any way with each other, or with other options known to a person with average knowledge in the technical field, without this limiting the scope of the present invention.

The invention claimed is:

1. A sensing device for on-line measurement of surface gas velocity, froth depth, apparent density and holdup in flotation cells, characterized in that it comprises:
   a first tube (2) having a first upper portion (21), a first lower portion (22) and a first internal conduit (23);
   a second tube (3), inserted in said first internal conduit (23) of said first tube (2), having a second upper portion (31), a second lower portion (32) and a second internal conduit (33), said second tube (3) having a longer length than said first tube (2);
   a first valve (4) connected to the first upper portion (21) of said first tube (2);
   a second valve (5) connected to the second upper portion (31) of said second tube (3);
   a first pressure gauge (6) connected to the first upper portion (21) of said first tube (2);
   a second pressure gauge (7) connected to the second upper portion (31) of said second tube (3);
   a first mass flow meter (8) connected to the portion of said first valve (5) opposing said first tube (2); and
   a second mass flow meter (9) connected to the portion of said second valve (6) opposing said second tube (3).

2. The sensing device (1) of claim 1, characterized in that said first tube (2) has an internal diameter of between 80 mm and 400 mm.

3. The sensing device (1) of claim 1, characterized in that said first tube (2) has a length of between 500 mm and 1000 mm.

4. The sensing device (1) of claim 1, characterized in that said second tube (3) has an internal diameter of between 40 mm and 300 mm.

5. The sensing device (1) of claim 1, characterized in that said second tube (3) has a length of between 1200 mm and 3000 mm.

6. The sensing device (1) of claim 1, characterized in that said first and second valves (4, 5) are solenoid valves.

7. The sensor device (1) of claim 1, characterized in that said first and second pressure gauges (6, 7) are piezoelectric sensors.

8. The sensing device (1) of claim 1, characterized in that said first and second mass flow meters (8, 9) are low pressure drop turbine sensors.

9. The sensing device (1) of claim 1, characterized in that said first tube (2) and said second tube (3) are arranged in a substantially coaxial manner.

10. The sensing device (1) of claim 1, characterized in that the upper end of said first tube (2) is disposed substantially coplanar with the upper end of said second tube (3).

11. A system (10) for on-line measurement of surface gas velocity in flotation cells, characterized in that it comprises:
   a sensing device comprising: a first tube (2) having a first upper portion (21), a first lower portion (22) and a first internal conduit (23); a second tube (3), inserted in said first internal conduit (23) of said first tube (2), having a second upper portion (31), a second lower portion (32) and a second internal conduit (33), said second tube (3) having a longer length than said first tube (2); a first valve (4) connected to the first upper portion (21) of said first tube (2); a second valve (5) connected to the second upper portion (31) of said second tube (3);
   a first pressure gauge (6) connected to the first upper portion (21) of said first tube (2); a second pressure gauge (7) connected to the second upper portion (31) of said second tube (3); a first mass flow meter (8) connected to the portion of said first valve (5) opposing said first tube (2); and a second mass flow meter (9) connected to the portion of said second valve (6) opposing said second tube (3); and
   a processor operatively connected to said first and second valves (4, 5), to said first and second pressure gauges (6, 7) and to said first and second mass flow meters (8, 9);
where the processor is configured to:
   control the opening and closing of the first and second valves (4, 5);
   obtain pressure measurements from these first and second pressure gauges (6, 7);
   obtain mass flow measurements from said first and second mass flow meters (8, 9); and
   obtain a value of the surface gas velocity from these pressure measurements and from these mass flow measurements.

12. The system (10) of claim 11, characterized in that it additionally comprises an information storage memory operatively connected to said processor, and in that said processor is configured to read information from said storage memory and write information to said storage memory.

13. The system (10) of claim 11, characterized in that said processor is further configured to communicate said surface gas velocity value to a central controller.

14. The system (10) of claim 11, characterized in that to obtain said gas surface velocity value, said processor is configured to:
   obtain a value of apparent density of the pulp from said pressure values obtained from said first and second pressure gauges (6, 7) and from the difference in length between said first and second tubes (2, 3);
   obtain a pressure variation value as a function of time from the pressure values obtained from the first and second pressure gauges (6, 7);
   obtain an atmospheric pressure value; and
   obtain a gas surface velocity value from said value of apparent density of the pulp, from said value of pressure variation as a function of time, from said value of atmospheric pressure and from the value of the length of the portion of said first tube (2) which is immersed in said flotation cell.

* * * * *